(12) United States Patent
Morrison et al.

(10) Patent No.: US 10,167,951 B2
(45) Date of Patent: Jan. 1, 2019

(54) SYSTEM AND METHOD FOR CALIBRATING A HYDRAULIC DRIVE SYSTEM

(71) Applicant: Deere & Company, Moline, IL (US)

(72) Inventors: Tom Morrison, Moline, IL (US);
David V. Rotole, Bloomfield, IA (US);
Eric M. Thies, Agency, IA (US);
Mitchell R. Usasz, Ottumwa, IA (US);
Walter Craig Wright, Pella, IA (US)

(73) Assignee: DEERE & COMPANY, Moline, IL (US)

(*) Notice: Subject to any disclaimer, the term of this patent is extended or adjusted under 35 U.S.C. 154(b) by 172 days.

(21) Appl. No.: 15/404,779

(22) Filed: Jan. 12, 2017

(65) Prior Publication Data

US 2017/0234426 A1    Aug. 17, 2017

Related U.S. Application Data

(60) Provisional application No. 62/294,045, filed on Feb. 11, 2016.

(51) Int. Cl.
*F16H 61/437* (2010.01)

(52) U.S. Cl.
CPC ...... *F16H 61/437* (2013.01); *B60Y 2200/222* (2013.01)

(58) Field of Classification Search
CPC .............. F16H 61/437; B60Y 2200/222
See application file for complete search history.

(56) References Cited

U.S. PATENT DOCUMENTS

| | | | |
|---|---|---|---|
| 5,249,422 A | 10/1993 | Smith et al. | |
| 6,305,162 B1 | 10/2001 | Cobo et al. | |
| 6,592,492 B1* | 7/2003 | Kalia | B60R 25/02144 |
| | | | 477/96 |
| 7,310,943 B2 | 12/2007 | Burgart et al. | |
| 7,373,776 B2 | 5/2008 | Burgart et al. | |
| 8,296,024 B2 | 10/2012 | Stoller et al. | |
| 2002/0052680 A1* | 5/2002 | Whitten | B60R 1/025 |
| | | | 701/49 |
| 2003/0121257 A1 | 7/2003 | Skinner | |
| 2006/0000659 A1* | 1/2006 | Teslak | B60K 6/12 |
| | | | 180/307 |
| 2006/0004507 A1* | 1/2006 | Teslak | B60K 6/12 |
| | | | 701/69 |
| 2008/0034720 A1 | 2/2008 | Helfrich et al. | |
| 2011/0112729 A1* | 5/2011 | Martin | A01B 69/008 |
| | | | 701/50 |
| 2012/0304960 A1* | 12/2012 | Weaver | B60W 10/06 |
| | | | 123/325 |

* cited by examiner

*Primary Examiner* — Hussein Elchanti
(74) *Attorney, Agent, or Firm* — Michael Best & Friedrich LLP

(57) ABSTRACT

A method of adjusting a hydraulic drive system includes determining a forward park position value, a reverse park position value, an initial forward position value, and an initial reverse position value of a control device and using these values to calculate a forward buffer value and a reverse buffer value. The forward buffer value and the reverse buffer value are used to determine an adjustment amount for the drive system. The adjustment amount can be used to properly adjust a drive system to avoid system errors.

19 Claims, 11 Drawing Sheets

|   |   |   |
|---|---|---|
|   | (A) | 2928 |
| + _____ | (B) | + 2499 |
|   |   | 5427 |
| ÷ 2 |   | ÷ 2 |
|   |   | 2713.5 |
| ÷ 1,000 |   | ÷ 1,000 |
|   |   | 2.7135 |
| + 0.250 |   | + 0.250 |
|   |   | 2.9635 |
| − _____ | (C) | − 2.77 |
|   | (D) | 0.193 |

SYSTEM AND METHOD FOR CALIBRATING A HYDRAULIC DRIVE SYSTEM

RELATED APPLICATION(S)

This application is based on U.S. Provisional Application Ser. No. 62/294,045, filed Feb. 11, 2016, the disclosure of which is incorporated herein by reference in its entirety and to which priority is claimed.

FIELD

Various exemplary embodiments relate to calibrating drive systems.

BACKGROUND

The use of hydrostatic drive systems for industrial, agricultural, and other task machines is well known. The hydrostatic drive utilizes pressurized hydraulic fluid to variably drive a hydraulic motor with one or more variable displacement hydrostatic pumps. A dual hydrostatic transmission may include two hydrostatic pumps that can be controlled by a user in a cab. The cab controls are connected to a wishbone arm that is operatively connected to a swash plate in each of the pumps. The wishbone can be pivoted from a neutral position in a first direction to indirectly move the swash plate in the pump for propelling a traction drive wheel on the vehicle forward, and can be pivoted in an opposite direction to move the swash plate and propel the traction drive wheel in the reverse direction. One or more operator controls and linkages connected to the wishbone allow an operator to set the position of the wishbone, and thus control the movement of the machine.

SUMMARY

Various exemplary embodiments are directed to a method of adjusting a hydraulic drive system. A drive system is operated, wherein the drive system has a control device that is operatively connected to a cable and a hydraulic pump, and wherein movement of the control device is configured to cause movement of the cable and movement of the cable is configured to cause an adjustment in an output of the hydraulic pump. A forward park position of the control device and a forward park value associated with the forward park position are determined. A reverse park position of the control device and a reverse park value associated with the reverse park position are determined. An initial forward position of the control device and an initial forward value associated with the initial forward position are determined. An initial reverse position of the control device and an initial reverse value associated with the initial reverse position are determined. The forward park value, the reverse park value, the initial forward position value, and the initial reverse position value are used to calculate a forward buffer value and a reverse buffer value. The forward buffer value and the reverse buffer value are used to determine an adjustment amount for the drive system.

According to another embodiment, a drive system is operated, wherein the drive system has a handle moveable in a slot, and wherein movement of the handle is configured to adjust the movement of a vehicle. A forward park position of the handle and a forward park value associated with the forward park position are determined. A reverse park position of the handle and a reverse park value associated with the reverse park position are determined. An initial forward position of the handle and a forward motion value associated with the initial forward position are determined. An initial reverse position of the handle and a reverse motion value associated with the initial reverse position are determined. The forward park value, the reverse park value, the forward motion value, and the reverse motion value are used to calculate a forward buffer value and a reverse buffer value. The forward buffer value and the reverse buffer value are used to determine an adjustment amount of the drive system.

Various exemplary embodiments are also directed to a method of performing a manual adjustment of a hydraulic drive system having a hydraulic pump, a handle configured to operate the hydraulic pump, a wishbone operatively connected to the hydraulic pump, a cable operatively connected to the handle and to the wishbone arm, and a sheath positioned around the cable. The wishbone is biased to a forward position and a first mark is made where the cable exits the sheath. The wishbone is biased to a rear position and a second mark is made where the cable exits the sheath. A third mark is made substantially equidistant between the first mark and the second mark. An adjustment mechanism is altered to adjust the position of the cable so that the exit of the sheath is substantially aligned with the third mark.

BRIEF DESCRIPTION OF THE DRAWINGS

The aspects and features of various exemplary embodiments will be more apparent from the description of those exemplary embodiments taken with reference to the accompanying drawings, in which:

FIG. 7 is an exemplary calculation sheet for adjusting a drive system;

FIG. 8 is an exemplary first table showing adjustment values for a drive system;

FIG. 9 is an exemplary second table showing adjustment values for a drive system;

DETAILED DESCRIPTION OF EXEMPLARY EMBODIMENTS

Figure 1:
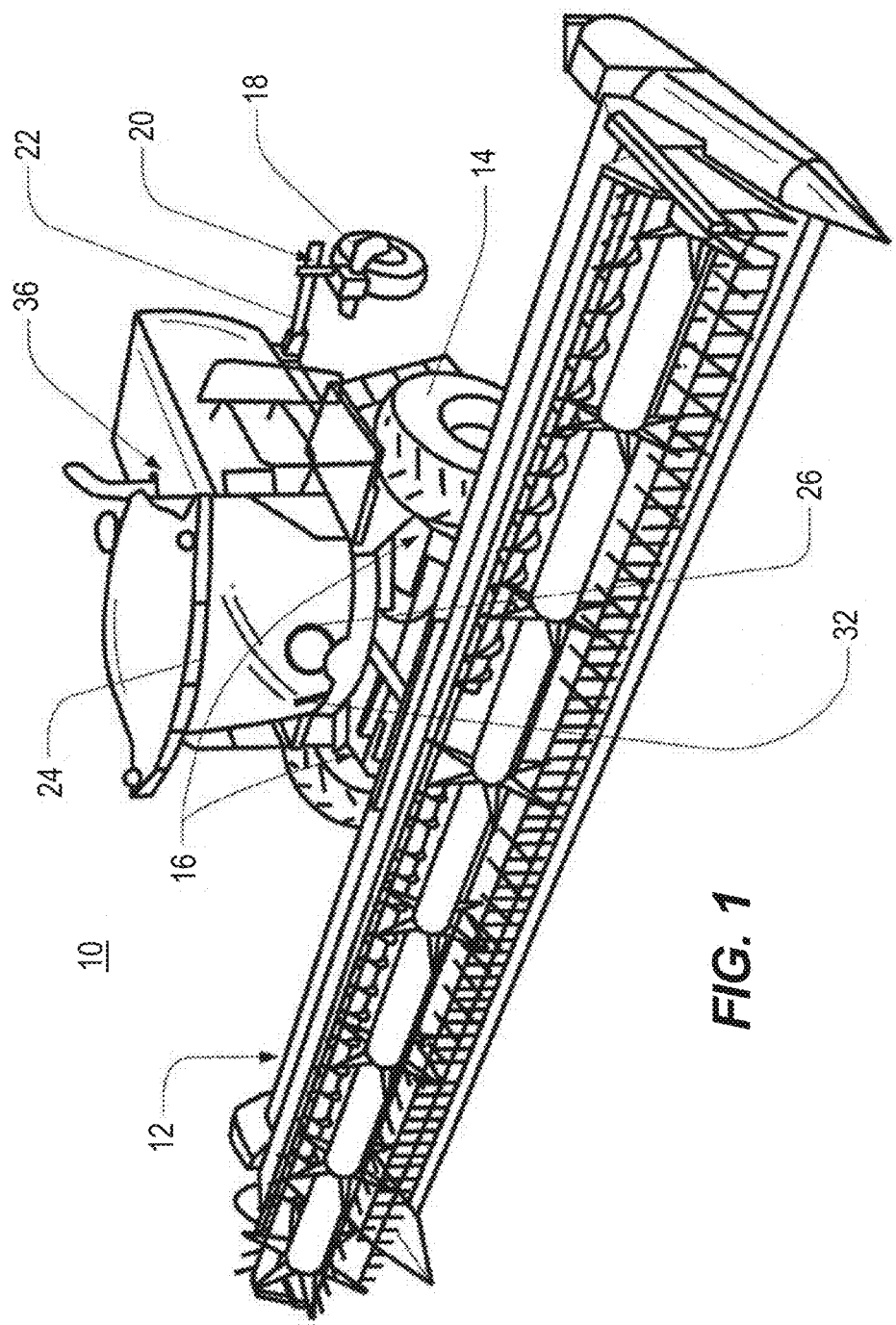
FIG. 1 is a simplified perspective view of an exemplary vehicle.

FIG. 1 shows an exemplary agricultural vehicle 10. It will be understood that the configuration of the vehicle 10 presented in FIG. 1 is intended only as an example and that other configurations of vehicles and other task machines in keeping can be used with the various exemplary embodiments described herein. As shown in FIG. 1, the vehicle 10 can be an agricultural windrower, with a header 12 for cutting and gathering crop material (e.g., a draper platform). Front wheels 14 may be fixed in a forward-facing orientation (i.e., may not pivot with respect to the vehicle 10), and may be independently driven by respective hydrostatic machines to steer the front of the vehicle 10. For example, a hydraulic drive circuit 16 for each of the front wheels 14, respectively, may include two different hydraulic (or other) machines such as a hydraulic pump driven by an engine 36 of the vehicle 10, and a hydraulic motor driven by the hydraulic pump. The motor-pump pairings of the respective drive circuits 16 may accordingly be used, respectively, to drive the left-side and right-side wheels 14 at independent (and, potentially, different) rotational speeds. In this way, although the front wheels 14 may not pivot with respect to the vehicle 10, the front wheels 14 may be steered (and may steer the vehicle 10) based upon the difference in speed between the left-side front wheel 14 and the right-side front wheel 14 (e.g., as controlled by the left-side and right-side hydraulic drive circuits 16, respectively). As discussed in greater detail below, a front steering device of various configurations may be utilized to control the relative speeds of the hydraulic motors, and thereby control steering of the front wheels 14.

Rear wheels 18 may also be steerable wheels, although the rear wheels 18 may be configured differently from the front wheels 14. For example, the rear wheels 18 may be mounted, respectively, on casters 20, which may allow the wheels 18 to rotate independently of each other and of a fixed rear-wheel support 22. It will be understood that various other configurations of the rear wheels 18 may be possible, and that the control architectures contemplated by this disclosure may also be employed with non-caster rear wheels, or other configurations.

The vehicle 10 may also include a cab 24 from which an operator may control the operation of the vehicle 10. A steering input device, such as a steering wheel 26, may be included in the cab 24, such that an operator may direct the steering of the vehicle 10 (in certain steering modes) by providing manual steering input. It will be understood that other steering input devices (e.g., levers, joysticks, touch-screen devices, and so on) may additionally (or alternatively) be utilized. Various other input devices may be also provided within the cab. For example, a hydraulic-system control device (e.g., a hydraulic control lever 32) may be provided for transitioning the vehicle between various operating modes (e.g., between an active operating mode in which various hydraulic systems are operating, a parked mode in which the vehicle is in an energized state but various hydraulic systems may not be operating, and so on).

Figure 2:
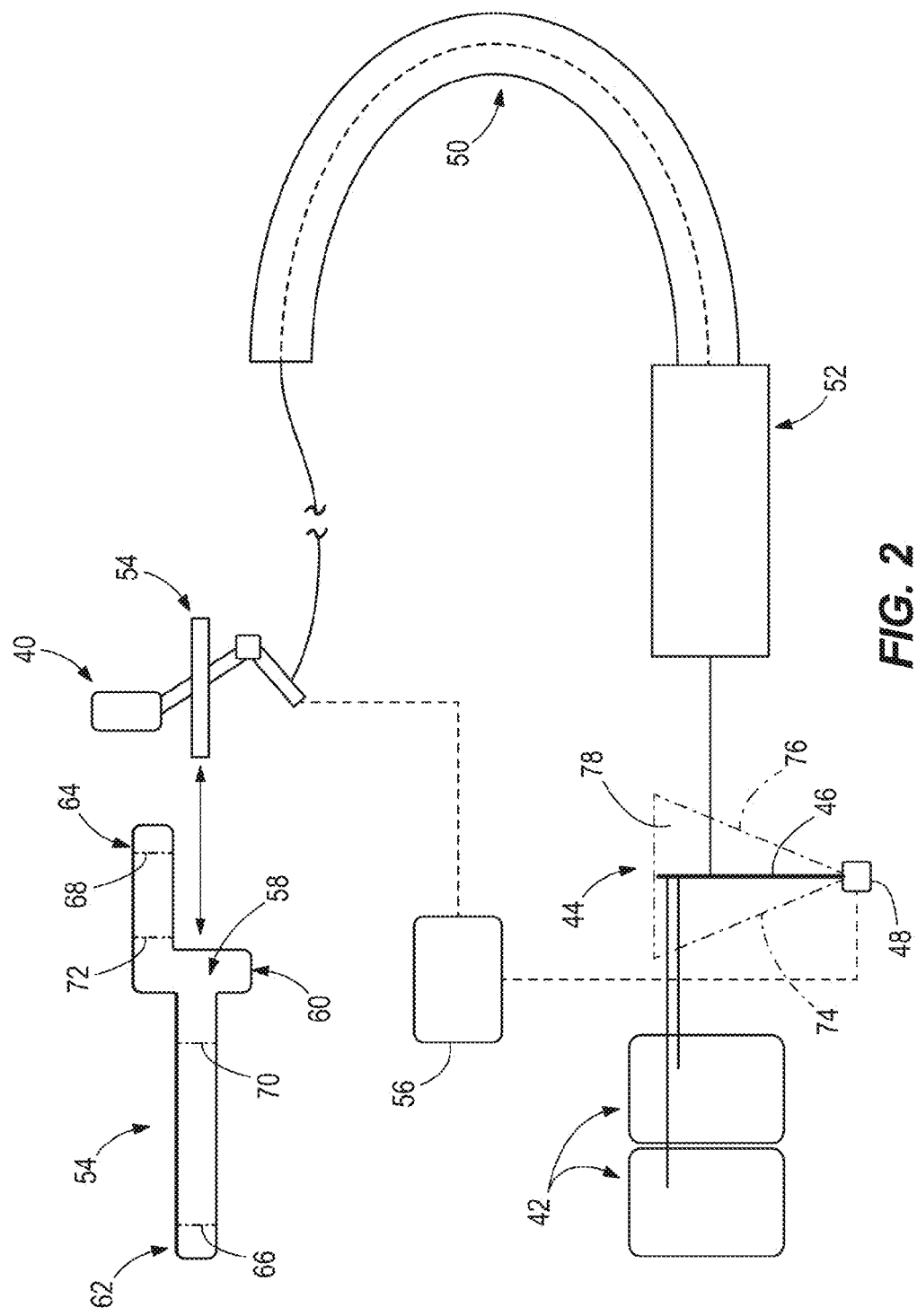
FIG. 2 is a schematic of a portion of a hydraulic drive control system.

FIG. 2 shows a schematic view of a portion of a hydrostatic ground drive system with a manually operated control device, for example a handle 40, operably connected to a hydraulic system. The hydraulic system includes one or more pumps 42 driven by an engine (not shown). The pumps 42 are connected to a wishbone assembly 44 having a wishbone arm 46 that is connected to a pivot 48 that allows the wishbone arm 46 to move from a centered position through a range of forward and reverse positions. Movement of the wishbone assembly 44 is controlled by the handle 40, which is operatively connected to the wishbone arm 46. The pivot 48 can include a sensor to detect the position of the wishbone arm 46 and output a signal, for example to a controller 56. In an exemplary embodiment, that handle is operatively connected to the wishbone arm 46 through a cable 50 having an adjustment mechanism. The handle 40 is moveable in a handle slot 54 between a neutral portion 58, a parking notch 60, a forward portion 62, and a reverse portion 64. The pumps 42 respond to an input produced by movement of the handle 40 to drive a motor and produce movement in the vehicle.

Figure 3:
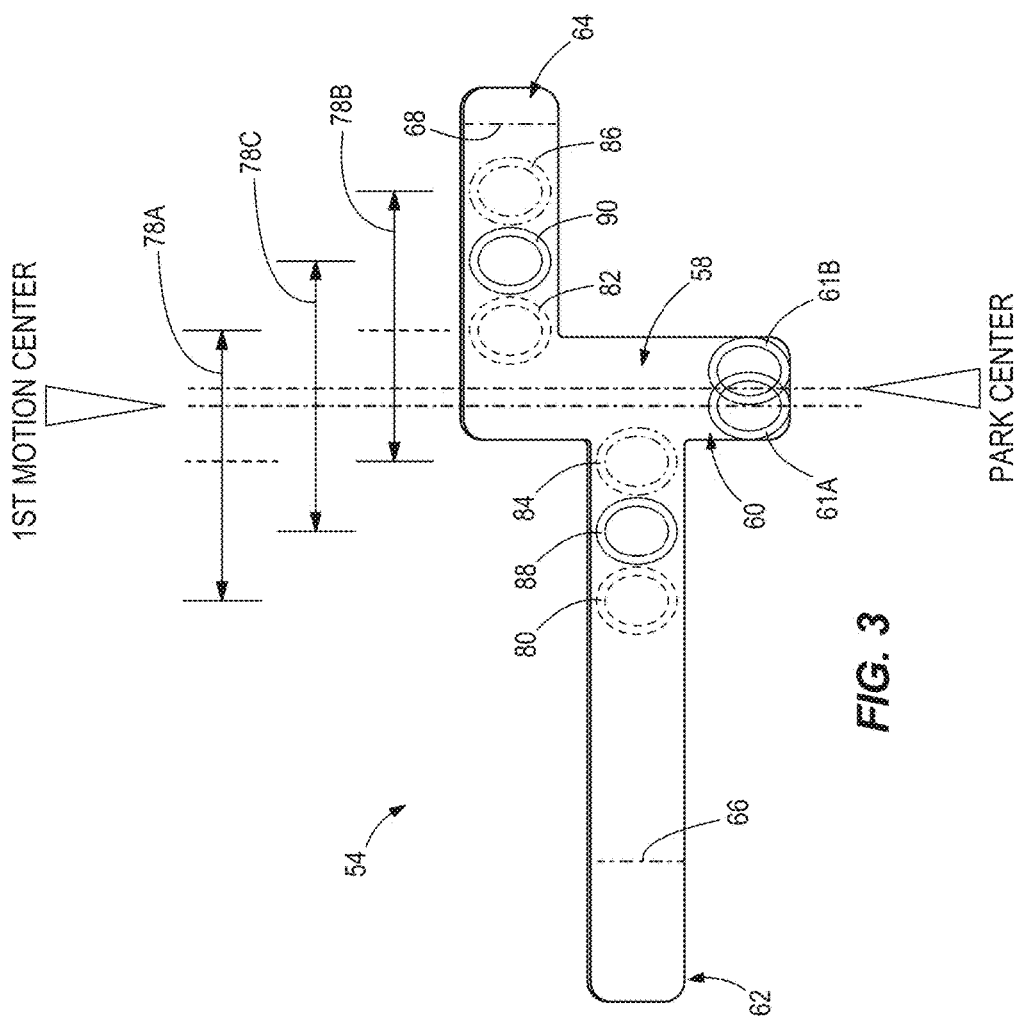
FIG. 3 is a schematic of a handle slot showing different exemplary drive positions.

Referring also to FIG. 3, when the handle is positioned in the parking notch 60, for example anywhere between a forward parked position 61A and a rear parked position 60 the controller 56 can determine that the vehicle is in a parked state. The controller 56 can be configured to take a number of actions, or to prevent a number of actions, when a parked state is detected. For example, the controller can be configured to initiate a parking brake switch and to cease or prevent operation of other external components depending on the type of vehicle. In alternative embodiments, the controller 56 can register the vehicle as being in a park state, and activate the parking brake switch, when the handle 40 is positioned in the neutral portion 58 for a certain period of time, or a park state can be initiated by other methods, including a manual switch. Indication can be given to a user that the vehicle is in park, either through one or more of tactile, audio, or visual indication.

The handle 40 is moveable along the forward portion 62 from an initial position to forward limit 66 and along the reverse portion 64 to a reverse limit 68. The forward and reverse limits 66, 68 are, for example, the physical limits of the handle in the forward and reverse directions which indicate a maximum forward and reverse speed. The exact positions of the forward and reverse limits 66, 68 can vary for different machines and it should be noted that these positions are examples and not to scale. The position of the handle 40 is translated into an output to the hydraulic system. The output and the position of the handle 40 can be expressed in terms of Voltage (V) or milli-Volts (mV), which is used as a reference for monitoring and fault detection.

According to various exemplary embodiments, the slot 54 also includes a handle initial forward position 70 where forward movement of the vehicle is triggered and initial reverse position 72 where reverse movement of the vehicle is triggered. The handle initial forward position 70 corresponds to a wishbone initial forward position 74 and the handle initial reverse position 72 corresponds to a wishbone initial reverse position 76 (FIG. 2). The wishbone initial forward and reverse positions 74, 76 bound a dead-band area 78 where movement of the handle 40, and correspondingly of the wishbone arm 46, do not result in movement of the vehicle. The exact positions of the initial forward and initial reverse positions 70, 72, 74, 76 can vary for different machines and it should be noted that these positions are examples and not to scale. The dead-band area 78 can be caused by different components in the system, including slack or misalignment in the cable 50 or other components connecting the handle 40 to the wishbone assembly 46, or components in the wishbone assembly 46 itself. In each vehicle, the size and position of the dead-band area 78 can be different. According to an exemplary embodiment, the dead-band area is approximately 250 mV in the forward and reverse direction from a calibrated center point.

FIG. 3 shows various exemplary positions associated with the handle 40, illustrating different scenarios for the dead-band area 78. A first set of positions 80, 82 indicates the initial forward and initial reverse positions of the handle 40 when there is misalignment in the forward direction, resulting in a forward biased dead-band area 78A. A second set of positions 84, 86 indicates the initial forward and initial reverse positions of the handle when there is misalignment in the reverse direction, resulting in a rearward biased dead band area 78B. If the initial forward or reverse positions are too close to the neutral portion, the vehicle may be inadvertently moved when shifting into or out of neutral and park. If the initial forward or reverse positions are too far from the neutral position, handle setup problems can result in user complaints. A third set of positions 88, 90 indicates initial positions after alignment to center the dead-band area 78C. It should be noted that these positions are examples and not to scale.

A sensor can be associated with the drive system to determine if the system is in an activate state that could result in movement of the vehicle. For example, a propulsion sensor associated with the wishbone assembly 46 can determine if one or more pumps 42 are active. This sensor can be used to determine if there is an error in the propulsion system that could result in unintentional vehicle movement when the operator thinks the vehicle should be in neutral or parked. Determination of such an error in the propulsion system can trigger a diagnostic trouble code (DTC) that causes a control unit or controller to shut down or lockout the system until the problem is fixed. For example, if the sensor detects that the drive system is in an activate state while the handle is in the park dead-band area, a DTC may be triggered. A DTC is also triggered if the park switch is active and the propulsion sensor reads outside the area of first motion. A number of factors, however, can result in a DTC, including if the mechanical center point shifts over time due to usage and wear on parts or is improperly calibrated to begin with. FIG. 3 shows examples of how this error can occur where positions 82 and 84 slightly overlap the neutral portion 58 or parking notch 60. This makes a DTC more likely to be triggered, as the system may consider that motion of the vehicle is occurring inside the park dead-band area as determined by the propulsion sensor.

Figure 4:
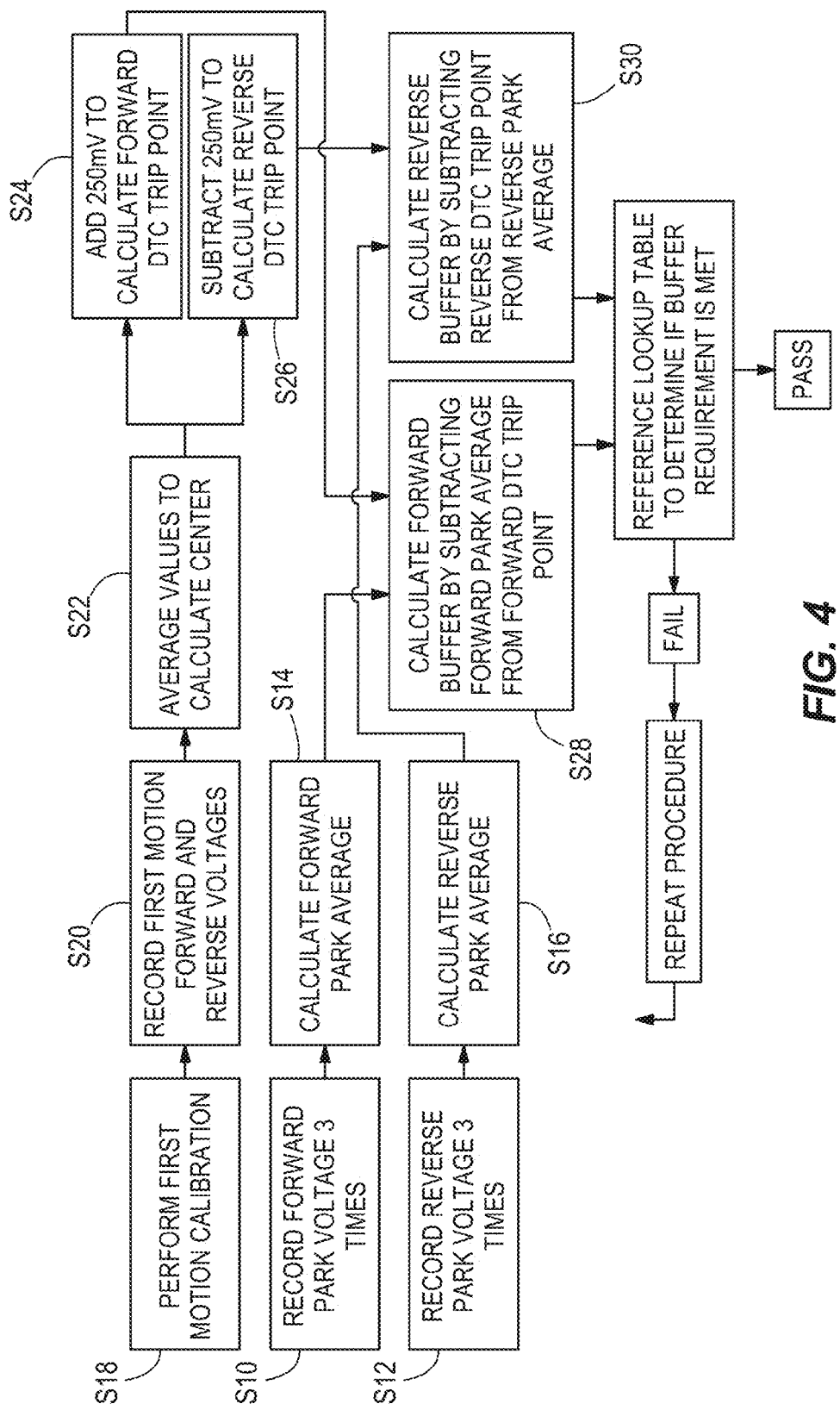
FIG. 4 is a flow chart of an exemplary method of adjusting a drive system.
Figure 5:
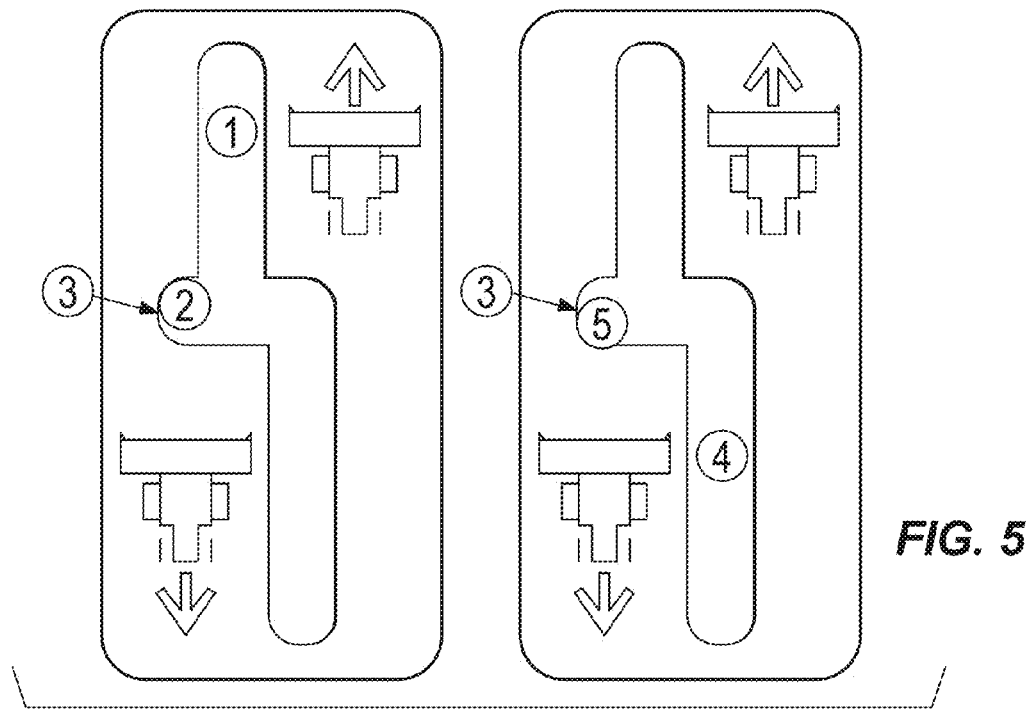
FIG. 5 is a top view of a hydraulic handle slot.

Various exemplary embodiments are directed to determining the initial forward and reverse positions and the forward and reverse parking positions, and adjusting the mechanical center of the drive system, and thus the motion center, to avoid DTCs. An example of this process is depicted in FIGS. 4 and 5. According to the exemplary embodiment, the forward park position and the reverse park position are determined. The vehicle is placed in an off state and the handle is moved to the forward limit 1 (the maximum distance possible in the forward direction) and is returned to the forward parked position 2, in the parking notch 3 as shown in FIG. 5, and the value of the propulsion sensor at the forward parked position 2 is measured and recorded as the Forward Park value (S10). The forward parked position is the first position when returning to park from the forward direction where there is an indication that vehicle is in park and/or the parking switch is activated. The handle is then moved to the reverse limit 4 (the maximum distance possible in the reverse direction) and returned to park to find the reverse parked position 5 and the value of the propulsion sensor at the reverse parked position 5 is measured and recorded as the Reverse Park value (S12). This measurement procedure can be performed multiple times, for example three times or more, and the results can be averaged to find the Forward-to-Park average (S14) and the Reverse-to-Park average (S16). The measurements can be performed by a person and/or a suitable diagnostic tool, either automatically, manually, or a combination thereof. The values may be recorded in V, mV, or other suitable units.

The distances from park to the initial forward and initial reverse positions are also calculated (S18). The vehicle is positioned on a flat surface and the engine is started with the handle in the park position. The handle is moved into neutral and slowly pushed forward until motion of the vehicle is detected. At the point that motion is detected, the value of the propulsion sensor is recorded as the Forward Motion value (S20). The handle is then returned to the park position. The handle is moved into neutral and slowly pushed in reverse until motion of the vehicle is detected. At the point that motion is detected, the value of the propulsion sensor is recorded as the Reverse Motion value (S20). The handle is then returned to the park position. The measurements can be performed by a person and/or a suitable diagnostic tool, either automatically, manually, or a combination thereof. The values may be recorded in V, mV, or other suitable units.

Figure 6:
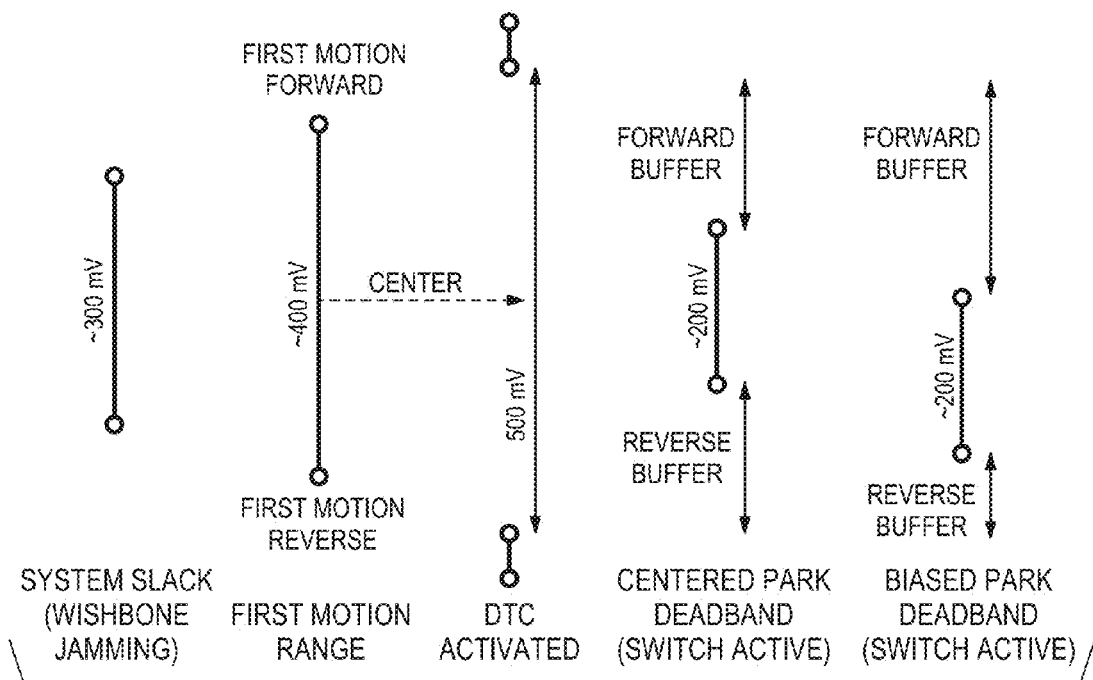
FIG. 6 is a schematic showing a centering and biasing procedure.

After these values are calculated they are used to calculate a Forward Buffer and a Reverse Buffer. According to various exemplary embodiments, the buffers can be equal in the forward and reverse directions (centered park dead-band), or they can be shifted to one side or the other (biased park dead-band) as depicted in FIG. 6. Shifting the buffer zone toward the forward or reverse directions can help to compensate for systems where non-uniform shifts in the system are likely to occur over time in the forward or reverse direction. In systems where there are no shifts, or the shifts are uniform in both directions, shifting the buffer zone is not needed.

FIG. 4 further describes the exemplary calibration process and FIG. 7 shows an exemplary equation used to calculate the Forward Buffer and the Reverse Buffer, which results as value (D). The column (1) shows a blank sheet with values to be filled in from the previous measurements and column (2) shows an exemplary calculation using values obtained from an example of the procedure. In making the calculation, (A) is the Forward Motion value in mV and (B) is the Reverse Motion value in mV which are added together and then divided by 2 (S22). The result of this value is then divided by 1,000 to change the value from mV into V. A value of 0.25V is then added (Forward Buffer) (S24) or subtracted (Reverse Buffer) (S26) as the DTC activation value to calculate the DTC trip points for forward and reverse. The 0.25V value is based on the deadband used in this exemplary embodiment, and can vary from different machines, or operations. Value (C) is then subtracted to obtain either the Forward Buffer or Reverse Buffer at (D). To calculate the Forward Buffer, the Forward Park average is used for value (C) (S28). To calculate the Reverse Buffer, the Reverse Park average is used for value (C) (S30). When the Forward Buffer and Reverse Buffer values are calculated, they can be used to determine the amount of adjustment needed to the system to achieve a desired result.

Figure 8:
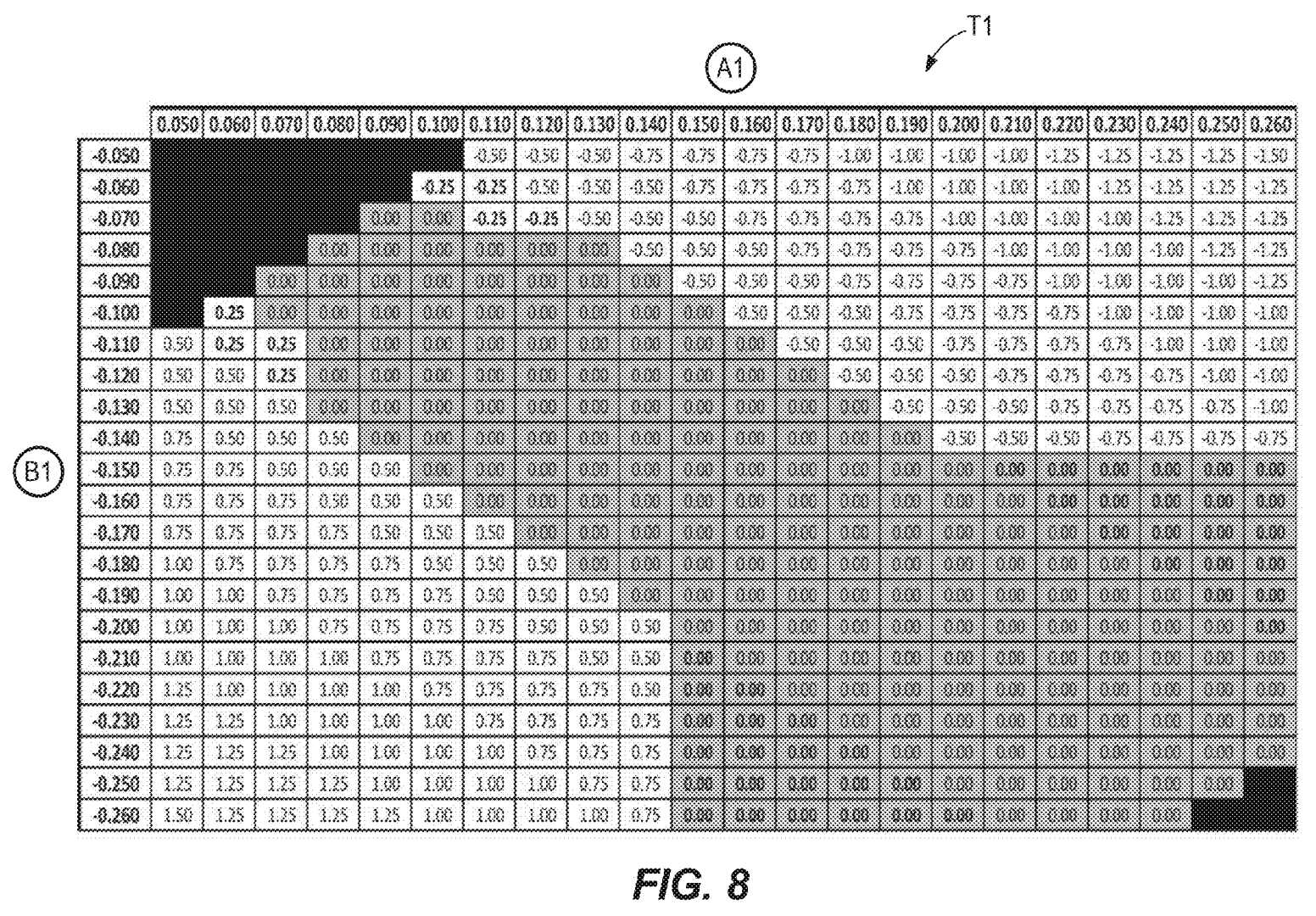

The table T1 in FIG. 8 shows an exemplary embodiment of determining how much adjustment is needed in a system. The (A1) values represent the Forward Buffer and the (B1) values represent the Reverse Buffer. The calculated values are intersected to determine the amount of adjustment. When viewed from the operator's movement of the handle, the adjustment can correspond to moving the center position between the first motion forward and the first motion reverse to move it towards the parking center. In certain embodiments, this can ensure that the first motion center falls within the neutral portion and that the first motion forward and first motion reverse are located outside of the neutral portion 58 58. In certain embodiments, the first motion center is substantially aligned with the park center after the adjustment. When viewed from the position of the wishbone and the propulsion sensor, the position of the park dead band is adjusted.

Figure 9:
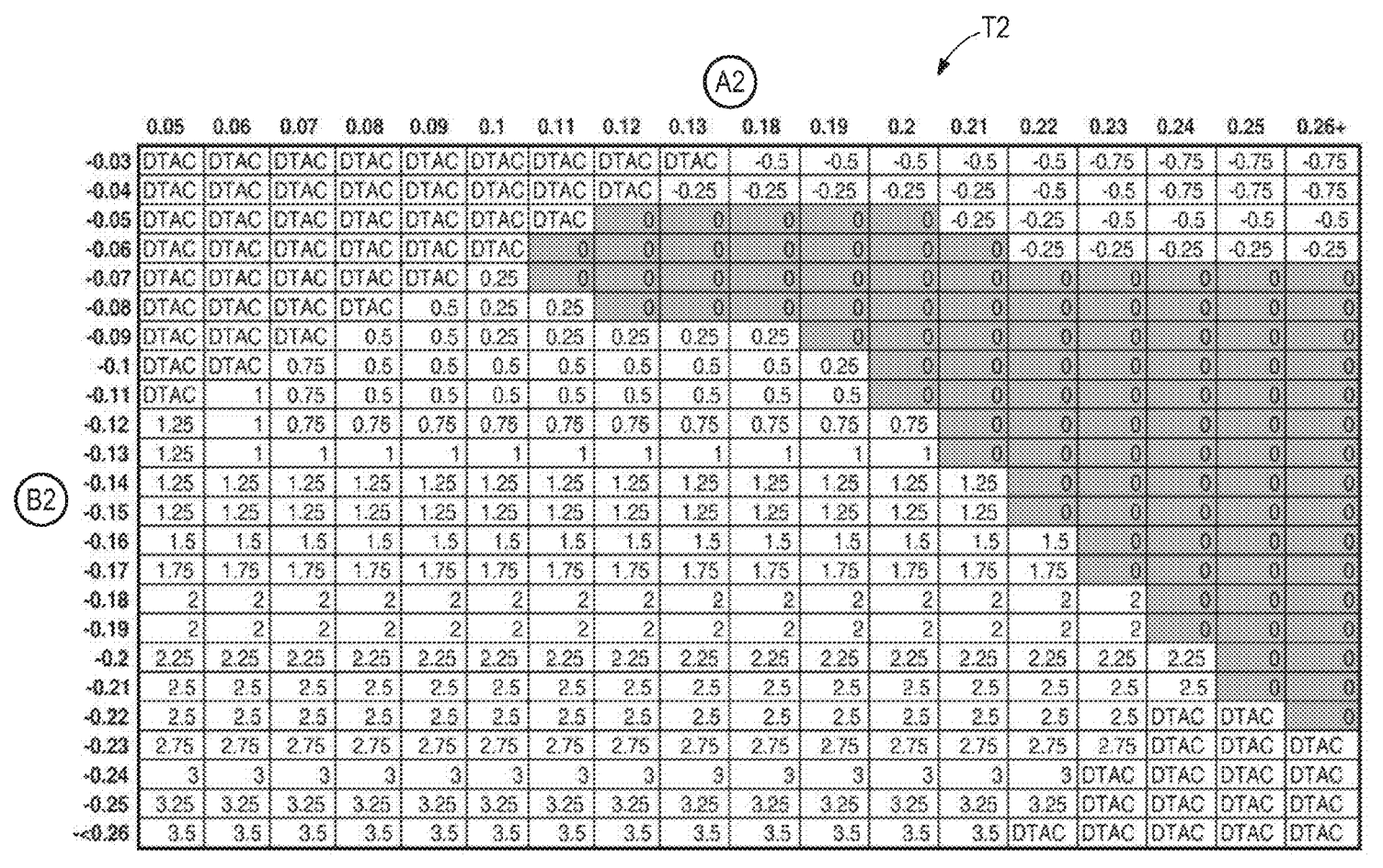

Table T1 shows an example of a table that can be used where the buffer is equal in the forward and reverse directions. The table T2 in FIG. 9 shows another exemplary embodiment of determining where the buffering is biased toward the reverse direction. The (A2) values represent the Forward Buffer and the (B2) values represent the Reverse Buffer.

Figure 10:
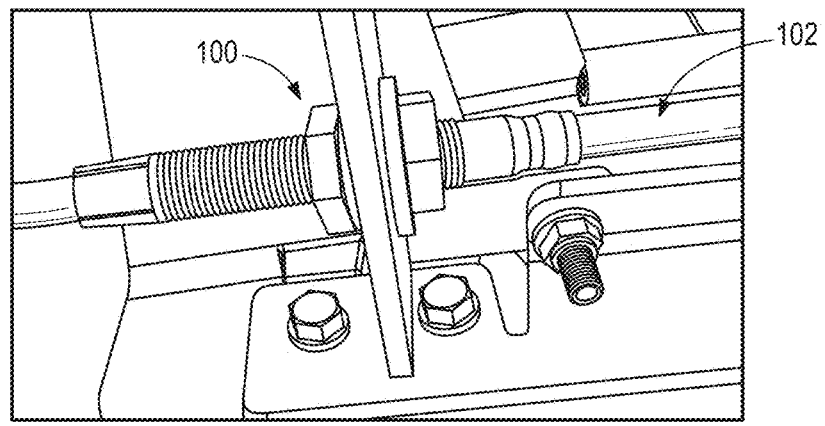
FIG. 10 is a partial view of a drive system showing an adjustment mechanism.

In an exemplary embodiment, adjustment is achieved by an adjustment mechanism, for example adjusting the position of a drive cable 102 relative to a cable sheath. This can be achieved by turning a jam nut 100 associated with the drive cable 102 as shown in FIG. 12. The numbers indicated in the chart in FIGS. 10 and 11 represent the number of turns of the jam nut 100 needed to adjust the system. The drive cable 102 can extend between the handle 40 and the wishbone arm 44, and turning the jam nut 102 can adjust the length of the drive cable 102, either to shorten the cable or lengthen the cable. If the values fall in the DTAC range, further action and repair of the system is required, for example by a dealer or repair center. In various embodiments, the calculations and reference to the tables can be performed automatically, or semi-automatically, by a diagnostic control or system.

Figure 11A:
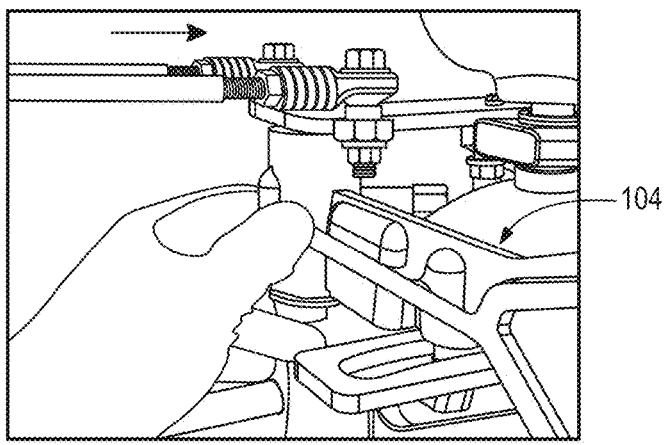
FIGS. 11A-11H are partial views of a drive system depicting a manual adjustment method.
Figure 11B:
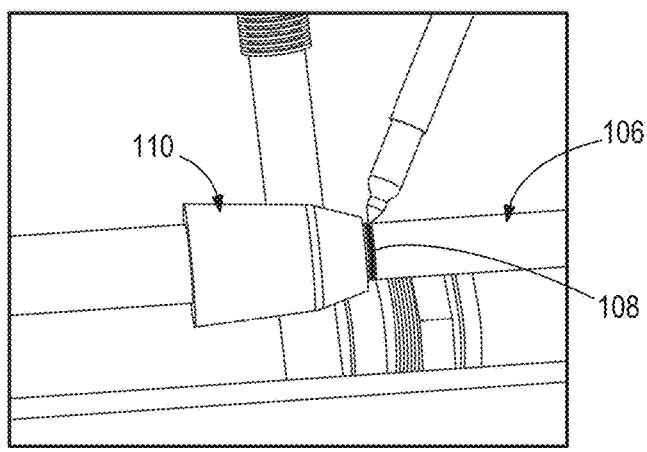
Figure 11C:
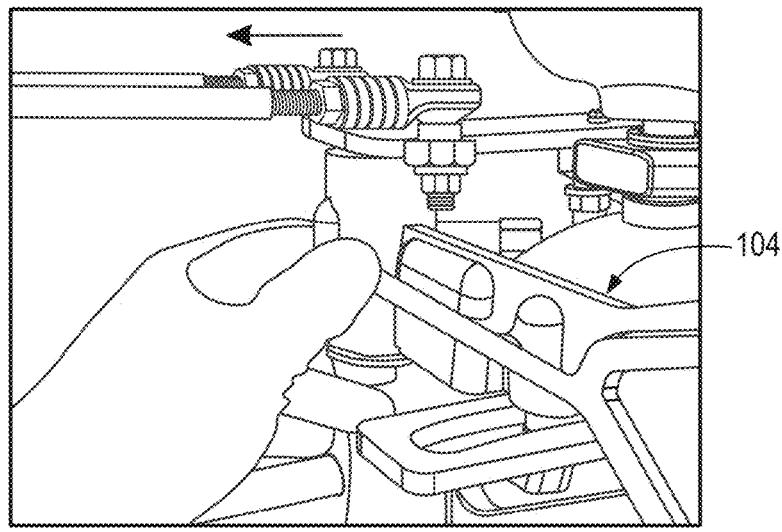
Figure 11D:
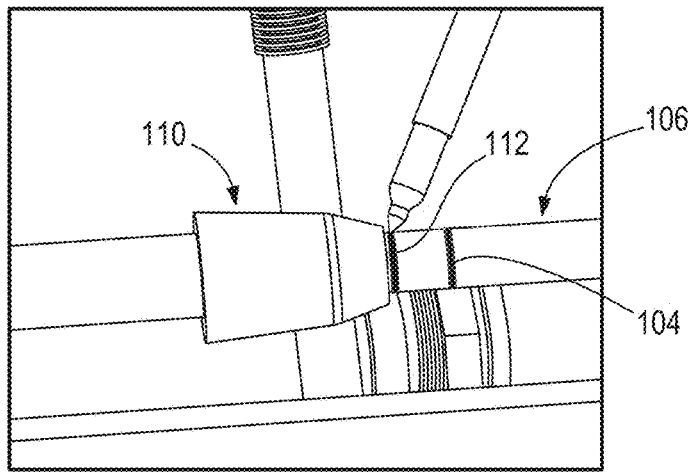
Figure 11E:
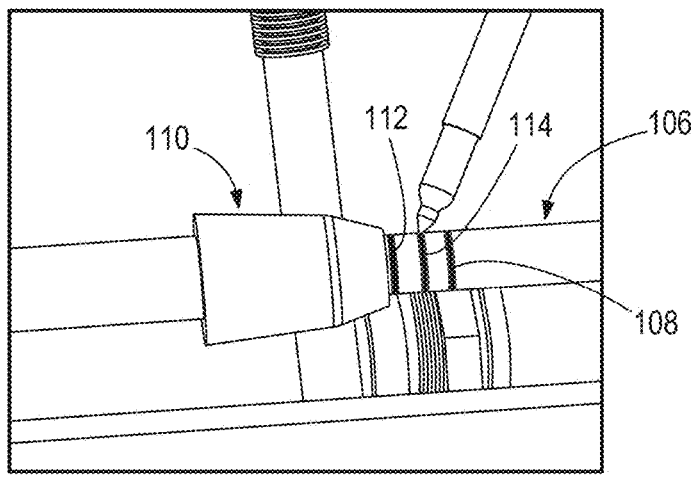
Figure 11F:
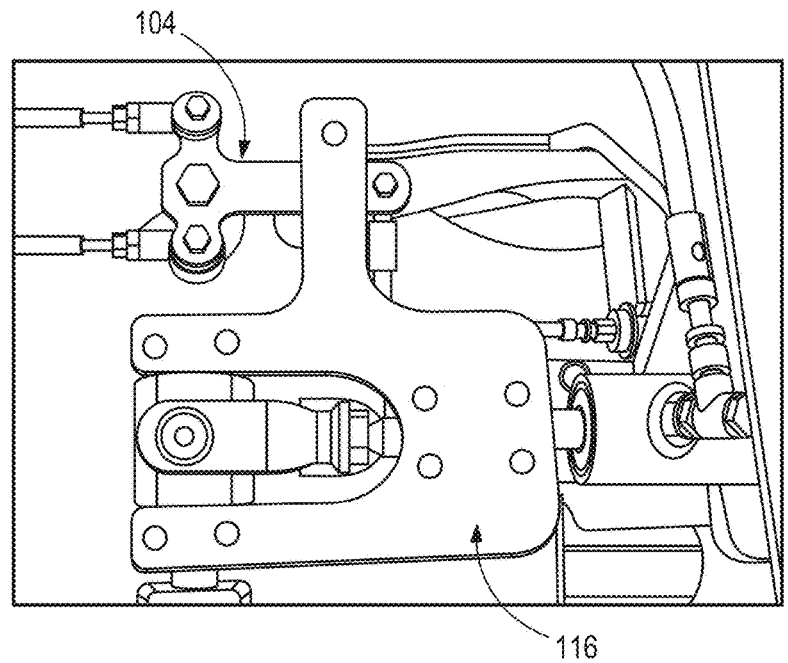
Figure 11G:
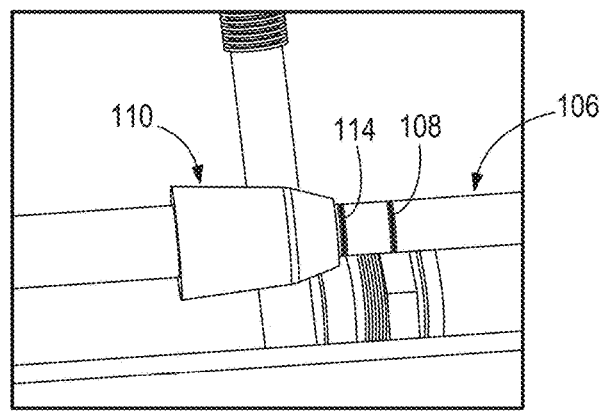
Figure 11H:
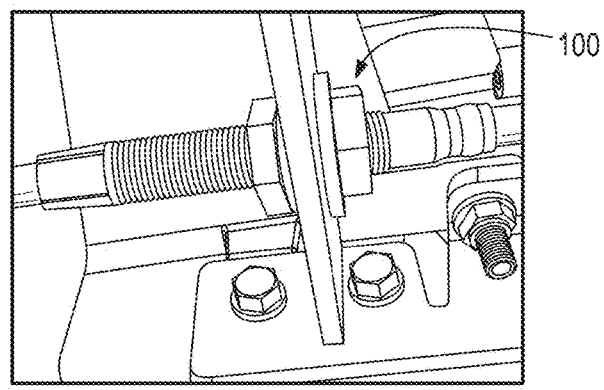

In certain circumstances it may be necessary to perform a rough adjustment of the mechanical center prior to performing the calibration steps discussed above. According to various exemplary embodiments, a cable sheath can be manually centered by a user as shown in the steps shown in FIGS. 11A-11H. Initially the handle is placed in the park position and a user pushes a wishbone 104 attached to the cable 106 toward the front of the machine (FIG. 11A) while the handle is held in place and makes a first mark 108 where the cable 106 comes out of the sheath 110 (FIG. 10). The wishbone 104 is then pulled toward the rear of the machine (FIG. 11C) while the handle is held in place and a second mark 112 is placed where the cable 106 comes out of the sheath 110 (FIG. 11D). A center mark 114 is then placed in the center of the first and second marks 108, 112 (FIG. 11E). A steering alignment tool 116 is then connected to the steering mechanism (FIG. 11F) and the jam nuts 100 are adjusted until the sheath no touches the center mark 114 without any force on the system (FIGS. 11G-H).

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of adjusting a hydraulic drive system, the method comprising:

operating a drive system having a control device that is operatively connected to a cable and a hydraulic pump, wherein movement of the control device is configured to cause movement of the cable and movement of the cable is configured to cause an adjustment in an output of the hydraulic pump;

determining, during the operating, a forward park position of the control device and a forward park value associated with the forward park position;

determining, during the operating, a reverse park position of the control device and a reverse park value associated with the reverse park position;

determining, during the operating, an initial forward position of the control device and an initial forward value associated with the initial forward position;

determining, during the operating, an initial reverse position of the control device and an initial reverse value associated with the initial reverse position;

using the forward park position value, the reverse park position value, the initial forward position value, and the initial reverse position value to calculate a forward buffer value and a reverse buffer value; and using the forward buffer value and the reverse buffer value to determine an adjustment amount for the drive system.

2. The method of claim 1, wherein determining the forward park position includes moving the control device from a forward limit position to a forward park position, and determining the reverse park position includes moving the control device from a reverse limit position to a reverse park position.

3. The method of claim 2, wherein determining the forward park value comprises moving the control device from the forward limit position to the forward park position a plurality of times, determining a value associated with each time, and taking an average of the values to obtain the forward park value.

4. The method of claim 1, wherein determining the forward park value includes obtaining a voltage value from a propulsion sensor.

5. The method of claim 1, wherein determining the initial forward position includes moving the control device from a park position in a forward direction until initial activation of the pump is detected, and determining the initial reverse position includes moving the control device from the park position in a reverse direction until initial activation of the pump is detected.

6. The method of claim 1, wherein the forward buffer value and the reverse buffer value are referenced to a table to determine the adjustment amount.

7. The method of claim 1, wherein the adjustment amount relates to adjusting the position of the cable with respect to the pump.

8. The method of claim 7, wherein the cable is connected to a wishbone arm and adjusting the position of the cable adjusts a length of the cable between the wishbone arm and the control device.

9. The method of claim 7, wherein the position of the cable is adjusted by rotating a fastener.

10. The method of claim 1, wherein the control device is a handle moveable in a slot.

11. The method of claim 1, wherein the drive system includes a dead-band area wherein movement of the control device in the dead-band area does not cause an adjustment in the output of the hydraulic pump, and wherein the adjustment amount for the drive system correlates to an adjusting of the position of the dead-band area.

12. A method of adjusting a hydraulic drive system, the method comprising:
  operating a drive system including a handle moveable in a slot, wherein movement of the handle is configured to adjust the movement of a vehicle;
  determining, during the operating, a forward park position of the handle and a forward park value associated with the forward park position;
  determining, during the operating, a reverse park position of the handle and a reverse park value associated with the reverse park position;
  determining, during the operating, an initial forward position of the handle and a forward motion value associated with the initial forward position;
  determining, during the operating, an initial reverse position of the handle and a reverse motion value associated with the initial reverse position;
  using the forward park value, the reverse park value, the forward motion value, and the reverse motion value to calculate a forward buffer value and a reverse buffer value; and
  using the forward buffer value and the reverse buffer value to determine an adjustment amount of the drive system.

13. The method of claim 12, wherein calculating the forward buffer value comprises averaging the forward motion value and the reverse motion value, and subsequently subtracting the forward park value.

14. The method of claim 13, wherein a DTC activation value is added to the average of the forward calibration value and the reverse calibration value prior to subtracting the forward park value.

15. The method of claim 12, wherein calculating the reverse buffer value comprises averaging the forward motion value and the reverse motion value, and subsequently subtracting the reverse park value.

16. The method of claim 15, wherein a DTC activation value is subtracted from the average of the forward motion value and the reverse motion value prior to subtracting the reverse park value.

17. The method of claim 12, wherein the slot includes a forward portion, a reverse portion, and a dead-band portion where movement of the handle in the dead-band portion does not result in movement of the vehicle.

18. The method of claim 17, wherein the adjustment amount corresponds to adjusting the position of the dead-band area.

19. The method of claim 18, wherein the position of the dead-band area is adjusted by adjusting the position of a sheath of a cable operatively connected to the handle and to a hydraulic pump.

* * * * *